(12) United States Patent
Mukai et al.

(10) Patent No.: US 11,359,596 B2
(45) Date of Patent: Jun. 14, 2022

(54) FRANCIS-TYPE TURBINE RUNNER AND FRANCIS-TYPE TURBINE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Takero Mukai, Yokohama Kanagawa (JP); Masahiko Nakazono, Kawasaki Kanagawa (JP); Toshifumi Kurokawa, Kamakura Kanagawa (JP); Ryosuke Shima, Kawasaki Kanagawa (JP); Kotaro Tezuka, Yokohama Kanagawa (JP)

(73) Assignees: KABUSHIKI KAISHA TOSHIBA, Tokyo (JP); TOSHIBA ENERGY SYSTEMS & SOLUTIONS CORPORATTON, Kanagawa (JP)

( * ) Notice: Subject to any disclaimer, the term of this patent is extended or adjusted under 35 U.S.C. 154(b) by 0 days.

(21) Appl. No.: 17/122,057

(22) Filed: Dec. 15, 2020

(65) Prior Publication Data

US 2021/0277862 A1    Sep. 9, 2021

(30) Foreign Application Priority Data

Mar. 5, 2020  (JP) .............................. JP2020-038090

(51) Int. Cl.
*F03B 3/12* (2006.01)
*F03B 3/02* (2006.01)

(52) U.S. Cl.
CPC ................ *F03B 3/125* (2013.01); *F03B 3/02* (2013.01); *F03B 3/121* (2013.01);
(Continued)

(58) Field of Classification Search
CPC .. F03B 3/02; F03B 3/121; F03B 3/125; F05B 2240/30; F05B 2240/301
See application file for complete search history.

(56) References Cited

U.S. PATENT DOCUMENTS

| 4,420,672 A | * | 12/1983 | Nolt, Jr. | ................. | B23K 25/00 219/160 |
| 2006/0115357 A1 | * | 6/2006 | Coulson | ................... | F03B 3/125 415/203 |

(Continued)

FOREIGN PATENT DOCUMENTS

| DE | 10325698 A1 | * | 12/2004 | .............. F03B 3/125 |
| GB | 728972 | * | 4/1955 | |

(Continued)

OTHER PUBLICATIONS

English translation for JP2014141903 (Year: 2013).*

(Continued)

*Primary Examiner* — Eldon T Brockman
*Assistant Examiner* — Brian O Peters
(74) *Attorney, Agent, or Firm* — Foley & Lardner LLP

(57) ABSTRACT

According to the embodiment, in a range from a plane P1 including a runner rotation center axis C and an end point 15E2 of an outlet end 15 of the vane 13, up to a plane P2 corresponding to a position where the plane P1 is moved by an angle, which is determined by dividing 360° by a value that is four times the number of vanes 13, in a runner rotation direction, when respective sections of the vane 13 are taken at a plane including the axis C and radially extending, in at least one section, a tangent T1 on a centerline Cv of the vane 13 passing through an intersection X at which the centerline Cv and a flowing water surface 12*f* intersect, and a tangent (Continued)

T2 on the flowing water surface 12f passing through the intersection X, define an acute angle on a negative pressure surface.

13 Claims, 12 Drawing Sheets

(52) U.S. Cl.
CPC ..... *F05B 2220/32* (2013.01); *F05B 2240/242* (2013.01); *F05B 2240/30* (2013.01)

(56) References Cited

U.S. PATENT DOCUMENTS

| | | | |
|---|---|---|---|
| 2011/0206518 A1* | 8/2011 | Bouvet | F03B 3/125 416/185 |
| 2015/0192101 A1* | 7/2015 | Rossi | B23K 15/0006 219/121.14 |
| 2018/0023534 A1* | 1/2018 | Martinez | F03B 3/18 415/171.1 |
| 2018/0313320 A1* | 11/2018 | Nakamura | F03B 3/183 |

FOREIGN PATENT DOCUMENTS

| | | | |
|---|---|---|---|
| JP | 05272444 | * | 3/1992 |
| JP | 2007154786 | * | 12/2005 |
| JP | 2006-153011 A | | 6/2006 |
| JP | 2011043095 | * | 3/2011 |
| JP | 2014141903 | * | 1/2013 |
| WO | WO-2021037424 A1 * | 3/2021 | ............. F03B 11/04 |

OTHER PUBLICATIONS

English translation for JP05272444 (Year: 1992).*
English translation for JP2007154786 (Year: 2005).*
English translation for JP2011043095 (Year: 2011).*
English translation for DE-10325698-A1 (Year: 2004).*

* cited by examiner

FRANCIS-TYPE TURBINE RUNNER AND FRANCIS-TYPE TURBINE

CROSS REFERENCE TO RELATED APPLICATIONS

This application is based upon and claims the benefit of priorities from the prior Japanese Patent Application No. 2020-38090, filed on Mar. 5, 2020; the entire contents of which are incorporated herein by reference.

FIELD

Embodiments described herein relate to a Francis-type turbine runner and a Francis-type turbine.

BACKGROUND ART

FIG. 7 is a sectional view of a conventional Francis-type turbine runner 100 (herebelow runner 100), along a runner axial direction (herebelow, axial direction). The runner 100 shown in FIG. 7 has a disk-like-shaped crown 11 coupled to a turbine main spindle in order to transmit rotation of the runner 100 caused by a water flow to the turbine main spindle, and a disk-like-shaped band 12 disposed axially apart from the crown 11 and opposed to the crown 11, and a plurality of vanes 13 fixed between the crown 11 and the band 12. The plurality of vanes 13 are circularly arranged with a circumferential interval therebetween.

When the runner 100 shown in FIG. 7 is rotated, a water flow enters a space between the crown 11 and the band 12 from an inlet end 14 of the vane 13, which is located radially outside. Thereafter, the water flow applies pressure energy to a pressure surface of the vane 13, and then flows downstream from an outlet end 15 of the vane 13, which is located radially inside. During such an operation, since a load such as a bending moment is applied to the vane 13 by a load from the water flow, it is necessary for the vane 13 to have a predetermined thickness to be able to withstand the load.

It is generally known that, during a normal operation of a Francis-type turbine comprising the aforementioned runner 100, a load applied to the crown 11 side of the outlet end 15 is larger than a load applied to the band 12 side thereof. Heretofore, little attention has been paid to ensuring the strength of a joint portion between the outlet end 15 and the band 12. Thus, it cannot be said that there are a lot of known techniques related to the strength between the outlet end 15 and the band 12, but a structure in which a curved portion that is concave toward the upstream side is formed in a portion of the outlet end on the band side has been proposed so far.

In the vicinity of the band side of the outlet end, a sudden impact (herebelow, impact load) acting on a pressure surface of a vane tends to occur frequently, especially when a turbine is started. The inventors have found this fact through intensive studies. However, no technique that takes measures against such an impact load has been proposed so far in the investigation by the inventors. Thus, the present inventors have conducted intensive studies to find a method for ensuring sufficient strength around a joint portion between the outlet end and the band, taking into consideration of the aforementioned impact load.

FIG. 8 is a view of the runner 100 shown in FIG. 7, seen from the crown side in the runner axial direction, wherein only three vanes 13 adjacent to one another are shown for convenience of explanation. FIG. 9 is a sectional (radial sectional) view of a part in the vicinity of the outlet end 15 of the vane 13 along a IX-IX line of FIG. 8. The IX-IX line is a line that passes through a runner rotation center axis C and an end point 15E1 of the outlet end 15 on the crown 11 side.

To be specific, the present inventors have paid attention to the shape of the joint portion between a part in the vicinity of the outlet end of the vane and the band. In a conventionally general structure, a part in the vicinity of the outlet end 15 of the vane 13 has a radial sectional shape in which the vane 13 rises diagonally from a flowing water surface of the band 12 toward a crown flowing water surface, as shown in FIG. 9. The present inventors have found that, because of this shape, stress can be excessively concentrated on a range R in FIG. 9. In addition, it has been found that the risk of damage to the vane 13 increases because the stress is concentrated on this range, upon the generation of the aforementioned impact load.

Further, it has been found that this risk particularly remarkable when a specific speed Ns represented by the following Equation (1) is 200 or less.

$$N_s = \frac{\sqrt{P}}{H^{\frac{5}{4}}} \tag{1}$$

(Ns . . . Specific speed (m-kw), n . . . Rated rotation speed (min-1), P . . . Turbine rated output (kW), H . . . Turbine rated net head (m))

In detail, in FIG. 9, a symbol T1 indicates a tangent on a centerline Cv of the vane 13, the tangent passing through an intersection X at which the curvilinearly continuous centerline Cv of the vane 13 and a flowing water surface of the band 12 intersect. A symbol T2 indicates a tangent on the flowing water surface of the band 12, the tangent passing through the intersection X. The centerline Cv of the vane 13 means, in a section of the vane body 13B which is a plate-like portion of the vane 13, a line which connects centers of inscribed circles drawn from the crown 11 to the band 12.

In the general structure shown in FIG. 9, the tangent T1 and the tangent T2 define an obtuse angle (angle Aco) on the negative pressure surface side (lower side in FIG. 9), and define an acute angle on the pressure surface side (upper side). In the case of such a shape, when the impact load is generated on the pressure surface of the vane 13, it is difficult for the vane 13 to uniformly bear the load in a flowing-water-surface direction (a direction along the centerline Cv). Then, since shear stress applied to the range R and a part in the vicinity thereof of the vane 13 increases in the vane thickness direction, the stress concentrated on them becomes excessively large. As a result, the risk of damage to the vane 13 increases because of the stress concentrated on and around the range R.

The embodiments described below provide a Francis-type turbine runner and a Francis-type turbine, which are capable of alleviating stress concentration on and around an outlet end of a vane on a band side so as to improve reliability.

DETAILED DESCRIPTION OF THE INVENTION

Figure 1:
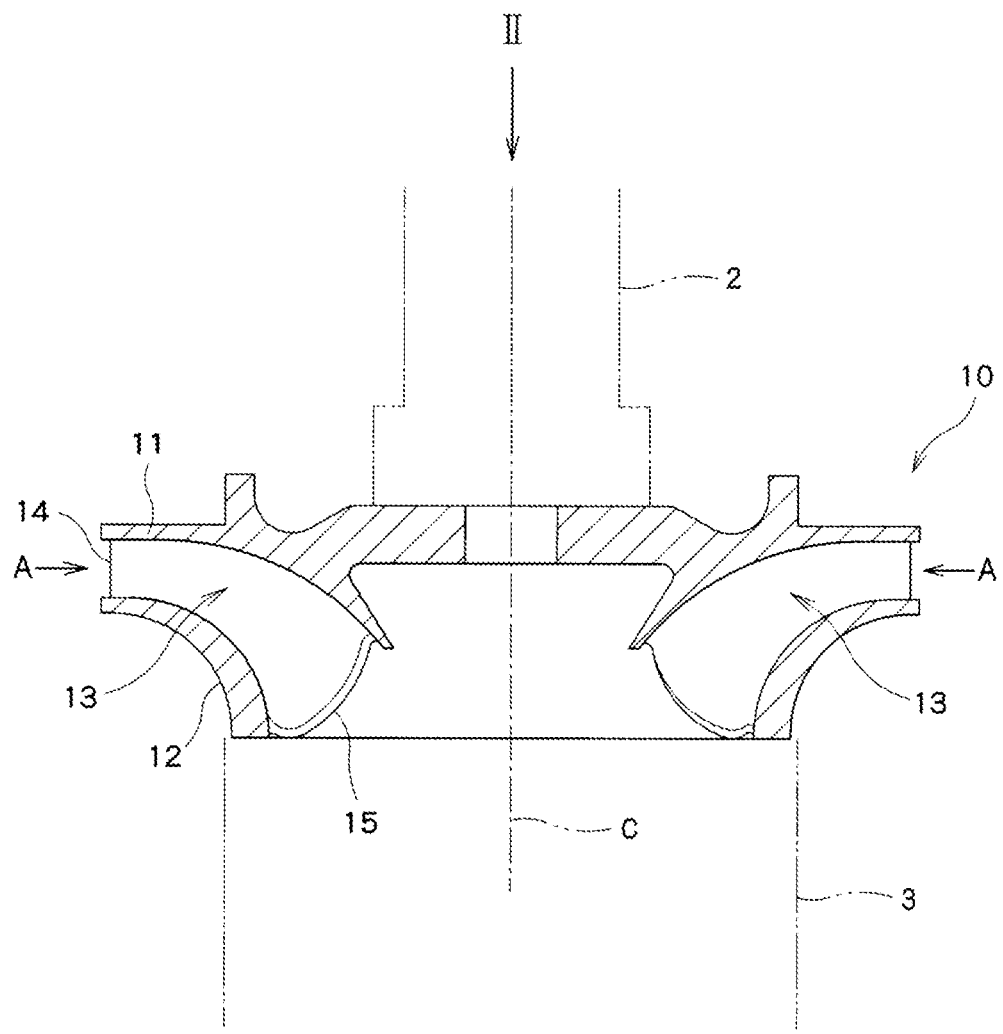
FIG. 1 is a sectional view of a Francis turbine according to a first embodiment, along a runner axial direction.

In one embodiment, a Francis-type turbine runner comprises a crown, a band, and a plurality of vanes provided between the crown and the band.

In the runner, in a range from a first plane including a runner rotation center axis and an end point of an outlet end of the vane on the band side, up to a second plane corresponding to a position where the first plane is rotated by an angle, which is determined by dividing 360° by a value that is four times the number of vanes, in a runner rotation direction about the runner rotation center axis, when respective sections of the vane are taken at a plane including the runner rotation center axis and radially extending from the runner rotation center axis, in at least one section of the respective sections, a tangent on a centerline of the vane, the tangent passing through an intersection at which the curvilinearly continuous centerline of the vane and a flowing water surface of the band intersect, and a tangent on the flowing water surface, the tangent passing through the intersection, define an acute angle on a negative pressure surface side of the vane, and define an obtuse angle on a pressure surface side thereof.

In one embodiment, a Francis-type turbine runner comprises a crown, a band, and a plurality of vanes provided between the crown and the band.

Each of the vanes has a thick root portion formed on the band side of a pressure surface to be joined to the band, and a thick root portion formed on the band side of a negative pressure surface to be joined to the band, with a thickness of each thick root portion being gradually increased toward the band. In the runner, in a range from a first plane including a runner rotation center axis and an end point of an outlet end of the vane on the band side, up to a second plane corresponding to a position where the first plane is rotated by an angle, which is determined by dividing 360° by a value that is four times the number of vanes, in a runner rotation direction about the runner rotation center axis, when respective sections of the vane are taken at a plane including the runner rotation center axis and radially extending from the runner rotation center axis, and when a curvilinear thick-root-portion centerline, which connects a plurality center of inscribed circles inscribed in the thick root portions on the pressure surface side and the negative pressure surface side, is drawn in each of the respective sections, in at least one section of the respective sections, a tangent on the thick-root-portion centerline, the tangent passing through an intersection at which the thick-root-portion centerline and a flowing water surface of the band intersect, and a tangent on the flowing water surface of the band, the tangent passing through the intersection, define an acute angle on the negative pressure surface side of the vane, and define an obtuse angle on the pressure surface side thereof.

In one embodiment, a Francis-type turbine runner comprises a crown, a band, and a plurality of vanes provided between the crown and the band.

In the runner, in a range from a line passing through an end point of an outlet end of the vane on the crown side and an end point of the outlet end in a runner rotation direction excluding the end point of the outlet end on the crown side, up to 5%, with respect to a vane length from the line up to an inlet end of the vane in a chord length direction, when respective sections of the vane are taken at a plane extending in a runner axial direction and including line passing through reference points at which a ratio of a distance from the end point of the outlet end on the crown side up to one reference point that is set on a crown side edge within the range up to 5%, with respect to a distance of the crown side edge of the vane, the distance of the crown side edge being from the end point of the outlet end on the crown side up to an end point of the inlet end on the crown side, and a ratio of a distance from a standard point up to the other reference point that is set on a band side edge within the range up to 5%, with respect to a distance of the band side edge of the vane, the distance of the band side edge being from the standard point, which is determined at a position where the line and a flowing water surface of the band intersect, up to an end point of the inlet end on the band side, are the same, in at least one section of the respective sections, a tangent on a centerline of the vane, the tangent passing through an intersection at which the curvilinearly continuous centerline of the vane and the flowing water surface of the band intersect, and a tangent on the flowing water surface of the band, the tangent passing through the intersection, define an acute angle on the negative pressure surface side of the vane, and define an obtuse angle on the pressure surface side thereof.

In one embodiment, a Francis-type turbine runner is a Francis-type turbine runner comprising a crown, a band, and a plurality of vanes provided between the crown and the band.

Each of the vanes has a thick root portion formed on the band side of a pressure surface to be joined to the band, and a thick root portion formed on the band side of a negative pressure surface to be joined to the band, with a thickness of each thick root portion being gradually increased toward the band. In the runner, in a range from a line passing through an end point of an outlet end of the vane on the crown side and an end point of the outlet end in a runner rotation direction excluding the end point of the outlet end on the crown side, up to 5%, with respect to a vane length from the line up to an inlet end of the vane in a chord length direction, when respective sections of the vane are taken at a plane extending in a runner axial direction and including line passing through reference points at which a ratio of a distance from the end point of the outlet end on the crown side up to one reference point that is set on a crown side edge within the range up to 5%, with respect to a distance of the crown side edge of the vane, the distance of the crown side edge being from the end point of the outlet end on the crown side up to an end point of the inlet end on the crown side, and a ratio of a distance from a standard point up to the other reference point that is set on a band side edge within the range up to 5%, with respect to a distance of the band side edge of the vane, the distance of the band side edge being from the standard point, which is determined at a position where the line and a flowing water surface of the band intersect, up to an end point of the inlet end on the band side, are the same, and when a curvilinear thick-root-portion centerline, which connects a plurality center of inscribed circles inscribed in the thick root portions on the pressure surface side and the negative pressure surface side, is drawn in each of the respective sections, in at least one section of the respective sections, a tangent on the thick-root-portion centerline, the tangent passing through an intersection at which the thick-root-portion centerline and the flowing water surface of the band intersect, and a tangent on the flowing water surface of the band, the tangent passing through intersection, define an acute angle on the negative pressure surface side of the vane, and define an obtuse angle on the pressure surface side thereof.

In one embodiment, a Francis-type turbine according to one embodiment comprises any of the aforementioned Francis-type turbine runners.

Figure 7:
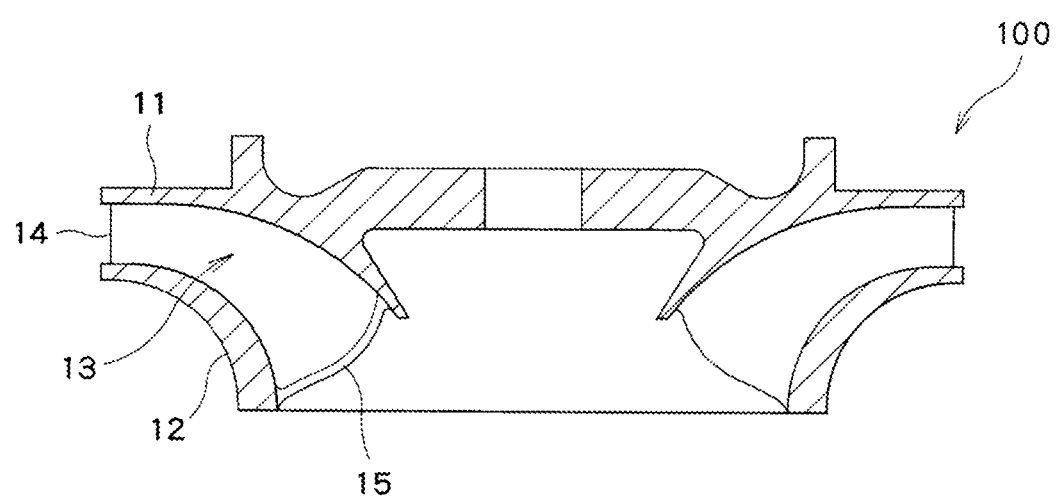
FIG. 7 is a sectional view of a conventional Francis-type turbine runner, along a runner axial direction.
Figure 8:
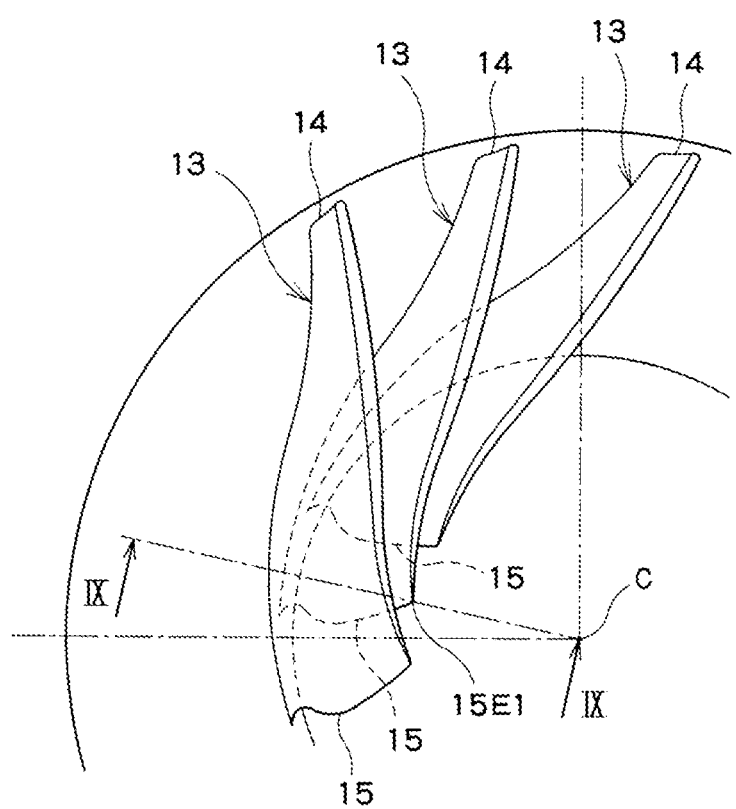
FIG. 8 is a view of the Francis-type turbine runner shown in FIG. 7, seen from a downstream side in the runner axial direction.
Figure 9:
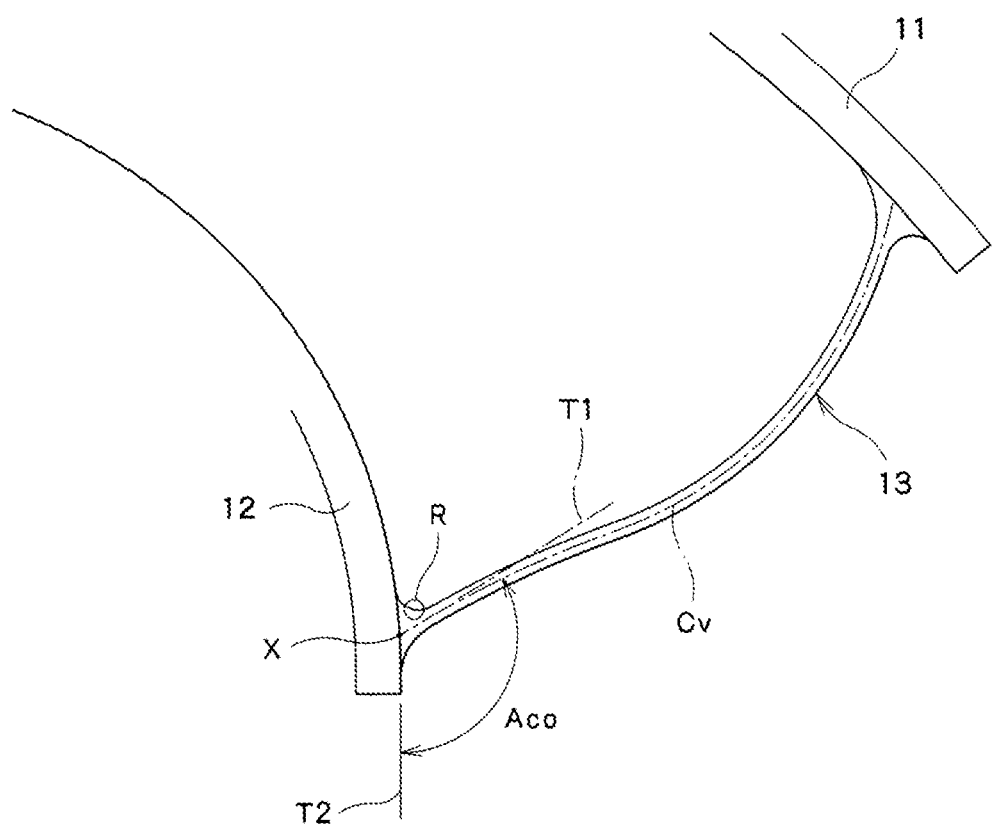
FIG. 9 is a sectional view of a part in the vicinity of an outlet end of a vane, along a IX-IX line of FIG. 8.

Herebelow, the respective embodiments are described in detail, with reference to the accompanying drawings. Constituent elements of the below embodiment, which are the same as those of the general Francis-type turbine runner 100 described with reference to FIGS. 7 to 9, are designated by the same symbols.

First Embodiment

FIG. 1 is a sectional view of a Francis turbine 1 according to a first embodiment, which is one type of a Francis-type turbine, along a runner axial direction. The Francis-type turbine herein means a Francis turbine or a Francis-type pump turbine.

The Francis turbine 1 shown in FIG. 1 comprises a Francis-type turbine runner 10 (herebelow runner 10) having a crown 11, a band 12, and a plurality of vanes 13 provided between the crown 11 and the band 12. In FIG. 1, a turbine main spindle 2 and a suction pipe 3, which are constituent elements of the Francis turbine 1, are shown by two-dot chain lines.

A water flow from a not-shown casing enters the runner 10 along a direction of an arrow A, and the runner 10 is rotated about a runner rotation center axis C by this water flow. In the description below, the mere term "axial (direction)/axially" means a runner axial direction which is a direction extending on the runner rotation center axis C or a direction parallel to the runner rotation center axis C. The mere term "radial (direction)/radially" means any direction orthogonal to the runner rotation center axis C. The term "circumferential (direction)/circumferentially" means a direction along a rotation direction of the runner 10 about the runner rotation.

The crown 11 is a disk-like-shaped member that is coupled to the turbine main spindle 2 in order to transmit the rotation of the runner 10 to the turbine main spindle 2. The band 12 is a disk-like-shaped member that is disposed axially apart from the crown 11 and opposed to the crown 11. To be precise, the band 12 can be said as a hollow disk-like-shaped member and/or a cylindrical shape tapering toward the suction pipe 3 (the downstream side in the flow direction of the water flow when the turbine is operated). A plurality of the vanes 13 are circularly arranged with a circumferential interval therebetween. In this embodiment, since the band 12 has a cylindrical shape tapering toward the suction pipe 3, each vane 13 has an inlet end 14 that is located radially outside, and an outlet end 15 that is located radially inside with respect to the inlet end 14. FIG. 1 shows an appearance of the outlet end 15. As compared with the outlet end shown in FIG. 7, the outlet end 15 of the vane 13 in this embodiment has a shape that is explicitly concaved in a U shape on the downstream side.

Figure 2:
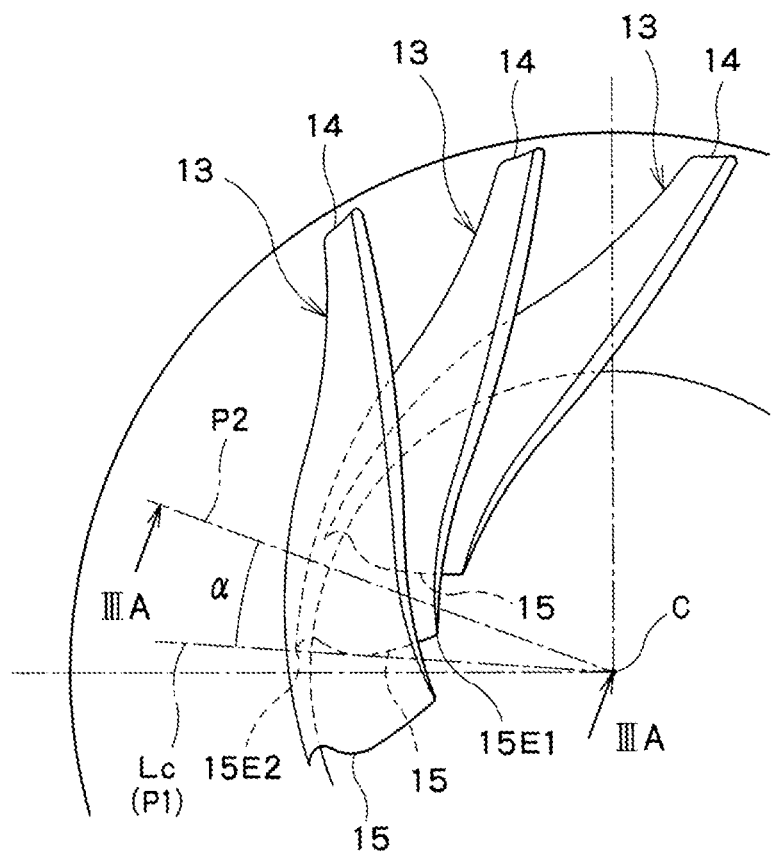
FIG. 2 is view of the Francis turbine runner, seen in a direction of an arrow II of FIG. 1.

FIG. 2 is a view of the runner 10 seen in the direction of an arrow II of FIG. 1, i.e., a view of the runner 10 seen from the crown 11 side. In FIG. 2, only three vanes 13 adjacent to one another are shown for convenience of explanation.

In FIG. 2, a symbol Lc indicates a radial standard line passing through the runner rotation center axis C and an end point 15E2 of the outlet end 15 on the band 12 side. A IIIA-IIIA line in FIG. 2 represents a line located at a position where the radial standard line Lc is moved by an angle α, which is determined by dividing 360° by a value that is four times the number of vanes 13, in the runner rotation direction. In this embodiment, a plane including the runner rotation center axis C and the radial standard line, in other words, a plane including the runner rotation center axis C and the end point 15E2 of the outlet end 15 of the vane 13 on the band 12 side, is defined as a first plane P1. In addition, a plane corresponding to a position where the first plane P1 is rotated by the angle α in the runner rotation direction about the runner rotation center axis C, is defined as a second plane P2. The first plane P1 and the second plane P2 define the angle α. The number of vanes 13 is, for example, 12 to 24, such as 16 in this embodiment. In this case, the angle α is 5.625 degrees.

Figure 3A:
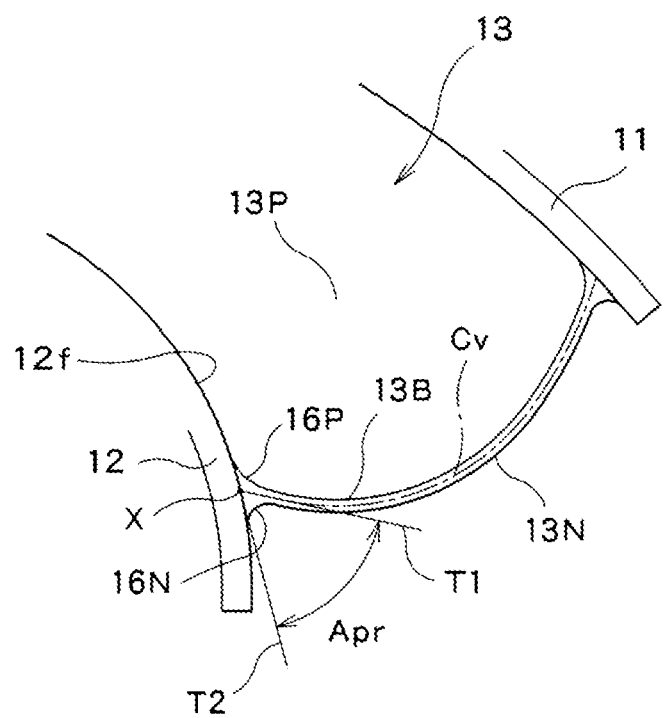
FIG. 3A is a sectional view of a part in the vicinity of an outlet end of a vane of the runner, along a IIIA-IIIA line of FIG. 2.
Figure 3B:
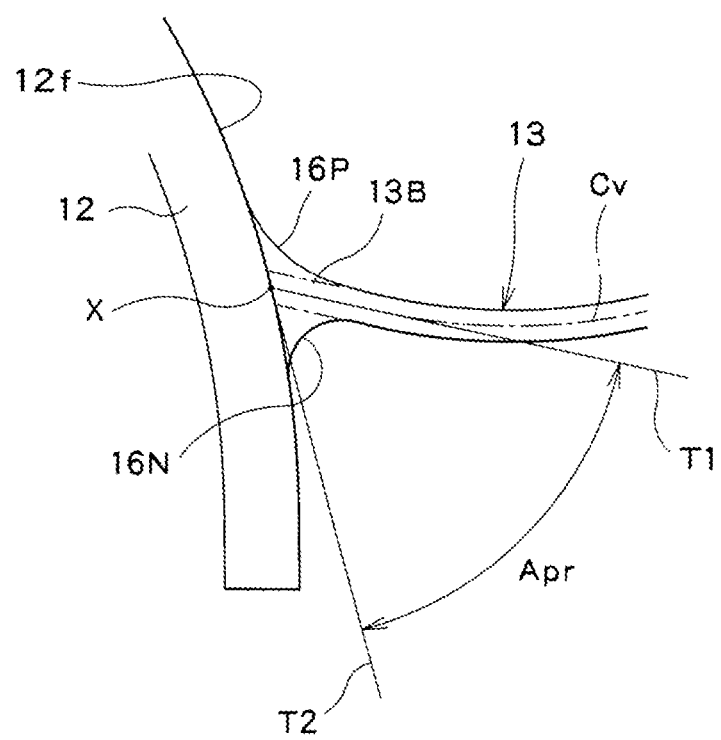
FIG. 3B is an enlarged view of FIG. 3A.

FIG. 3A is a sectional view of a part in the vicinity of the outlet end 15 of the vane 13 of the runner 10, along the IIIA-IIIA line of FIG. 2. FIG. 3B is an enlarged view of FIG. 3A. FIG. 3A is a sectional view at a plane axially extending along the IIIA-IIIA line. Herebelow, the section cut at a plane extending radially from the runner rotation axis line C and extending in the runner axial direction is sometimes referred to as radial section.

As shown in FIGS. 3A and 3B, the vane 13 is composed of a plate-like vane body 13B having a substantially constant thickness from the crown 11 to the band 12, and thick root portions 16P and 16N. The thick root portion 16P is a portion formed on the band 12 side of a pressure surface 13P to be joined to the band 12, with a thickness of the thick root portion 16P being gradually increased toward the band 12. The thick root portion 16P is a portion formed on the band 12 side of a negative pressure surface 13N to be joined to the band 12, with a thickness of the thick root portion 16N being gradually increased toward the band 12. Each thick root portion 16P, 16N extends from the inlet end 14 to the outlet end 15.

In this embodiment, in a range from the first plane P1 up to the angle α in the runner rotation direction about the runner rotation axis line C, i.e., up to the second plane P2, when respective sections (respective radial sections) of the vane 13 are taken at innumerable planes (plural planes) each including the runner rotation center axis C and radially extending from the runner rotation center axis C, in at least one section of the respective sections, a tangent T1 on a centerline Cv of the vane 13, the tangent T1 passing through an intersection X at which the curvilinearly continuous centerline Cv of the vane 13 and the flowing water surface 12f of the band 12 intersect, and a tangent T2 on the flowing water surface 12f of the band 12, the tangent T2 passing through the intersection X, define an acute angle (angle Apr) on the negative pressure surface 13N side of the vane 13, and define an obtuse angle on the pressure surface 13P side thereof, as shown in FIGS. 3A and 3B. The centerline Cv of the vane 13 means, in the section of the vane body 13B which is a plate-like portion of the vane 13, a line which connects centers of inscribed circles drawn from the crown 11 to the band 12.

In this embodiment, at least in the section along the IIIA-IIIA line, the tangent T1 and the tangent T2 define an acute angle on the negative pressure surface 13N side of the vane 13, and define an obtuse angle on the pressure surface 13P side thereof. In more detail, in all the respective radial sections in the range from the first plane P1 up to the second plane P2, the tangent T1 and the tangent T2 and respective tangents corresponding to them define an acute angle on the negative pressure surface 13N side of the vane 13, and define an obtuse angle on the pressure surface 13P side thereof. However, in one of the respective radial sections in the range from the first plane P1 up to the second plane P2, a pair of or pairs of tangents corresponding to the tangent T1 and the tangent T2 may define an acute angle on the negative pressure surface 13N side of the vane 13, and may define an obtuse angle on the pressure surface 13P side thereof.

As described above, in a case where, in all the respective radial sections in the range from the first plane P1 up to the second plane P2, when the tangent T1 and the tangent T2 and respective tangents corresponding to them define an acute angle on the negative pressure surface 13N side of the vane 13, and define an obtuse angle on the pressure surface 13P side thereof, the joint portion between the vane 13 and the band 12 has a shape that is significantly different from the conventional structure shown in FIG. 7, as is apparent from the comparison between FIGS. 1 and 7. When a section of the joint portion between the vane 13 and the band 12 is verified, the runner may be cut to verify a sectional shape, design data of the runner may be used to verify a sectional shape, or the shape of the runner may be specified by a 3D scanner and the specified data may be used to verify a sectional shape, for example.

Next, operations of the embodiment are described.

In the Francis turbine 1, a water flow enters from the inlet end 14 of the vane 13 into a space between the crown 11 and the band 12, and applies pressure energy to the pressure surface of the vane 13, so that the runner 10 is rotated. During such an operation, the vane 13 is subjected to a load, such as a bending moment, which is caused by a load from the water flow. In addition, the vane 13 may be subjected to a bending moment caused by a sudden load (impact load).

In this embodiment, as shown in FIG. 3A, in a range from the radial standard line Lc up to the angle α in the runner rotation direction, when respective sections (respective radial sections) are taken at a plane radially extending from the runner rotation center axis C and extending in the runner axial direction, in at least one section of the respective sections, the tangent T1 and the tangent T2 define an acute angle on the negative pressure surface 13N side of the vane 13, and define an obtuse angle on the pressure surface 13P side thereof, as shown in FIGS. 3A and 3B.

In the case of such a shape, when an impact load is applied to the pressure surface 13P of the vane 13 in the vicinity of the outlet end 15, for example, the vane 13 can be deformed so as to be pulled in its flowing-water-surface direction (the direction along the centerline Cv), whereby the vane 13 can bear a part of the impact load in its flowing-water-surface direction. Thus, it is possible to prevent the shear stress in the vane thickness direction from becoming excessively large, on and around the outlet end 15 of the vane 13 on the band 12 side.

Thus, according to this embodiment, it is possible to relieve stress concentration on and around the outlet end 15 of the vane 13 on the band 12 side. The shape according to this embodiment is particularly effective, under a condition that, when an impact load is generated in the vicinity of the outlet end 15 of the vane 13, an integrated value of the load received by the pressure surface 13P of the vane 13 from the band 12 to the crown 11 on a line included in the radial section is significantly large. Namely, under this condition, strength around the joint portion between the outlet end 15 and the band 12 can be particularly effectively secured.

In addition, when a specific speed Ns represented by the aforementioned Equation (1) is 200 or less, an impact load tends to often occur. Thus, when the specific speed Ns is 200 or less, the Francis-type turbine having the vane shape according to this embodiment (and below embodiments) functions particularly effectively.

$$N_s = \frac{\sqrt{P}}{H^{\frac{5}{4}}} \quad (1)$$

(Ns ... Specific speed (m-kw), n ... Rated rotation speed (min-1), P ... Turbine rated output (kW), H ... Turbine rated net head (m))

Second Embodiment

Next, a second embodiment is described with reference to FIGS. 4A and 4B. Constituent elements of the second embodiment, which are the same as those of the first embodiment, are designated by the same symbols, and description thereof is sometimes omitted.

Figure 4A:
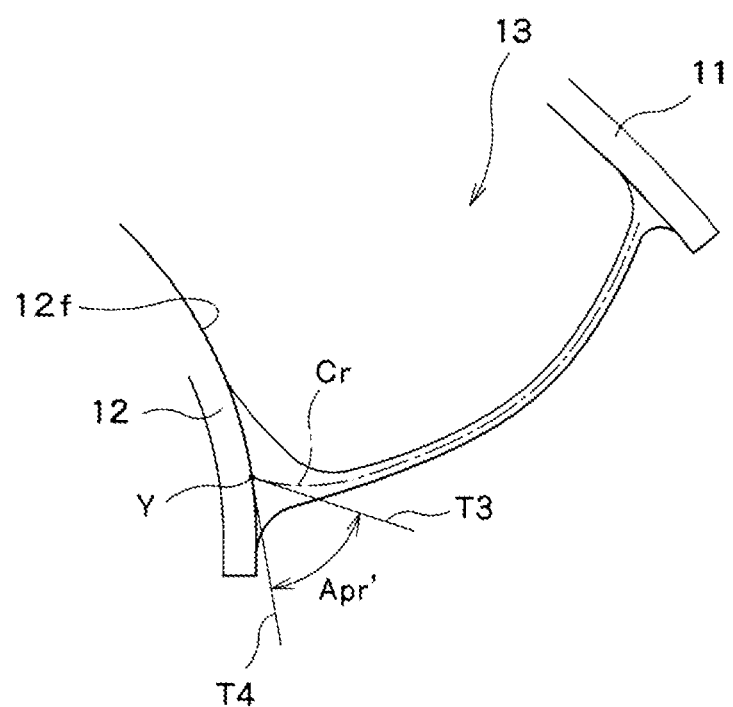
FIG. 4A is a sectional view of a part in the vicinity of an outlet end of a vane of a Francis turbine runner according to a second embodiment, corresponding to the sectional view along the IIIA-IIIA line of FIG. 2.

FIG. 4A is a sectional view of a part in the vicinity of an outlet end 15 of a vane of 13 of a Francis turbine runner according to a second embodiment, corresponding to the sectional view along the IIIA-IIIA line of FIG. 2. FIG. 4B is an enlarged view of FIG. 4A.

Figure 4B:
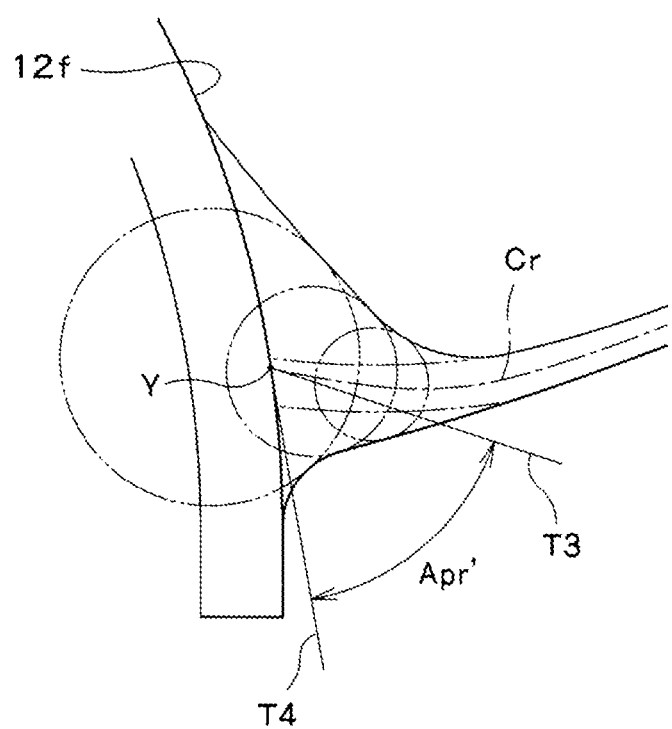
FIG. 4B is an enlarged view of FIG. 4A.

In this embodiment, in a range (see FIG. 2) from the first plane P1 shown in FIG. 2 up to a second plane P2 corresponding to a position where the first plane P1 is rotated by an angle α, which is determined by dividing 360° by a value that is four times the number of vanes 13, in the runner rotation direction about the runner rotation center axis C, when respective sections (respective radial sections) of the vane 13 are taken at innumerable planes (plural planes) each including the runner rotation center axis C and radially extending from the runner rotation center axis C, similarly to the first embodiment, and when a curvilinear thick-root-portion centerline Cr, which connects a plurality center of inscribed circles inscribed in the thick root portions 16P and 16N on the pressure surface 13P side and the negative pressure surface 13N side, is drawn in each of the respective sections, in at least one section of the respective sections, a tangent T3 on the thick-root-portion centerline Cr, the tangent t3 passing through an intersection Y at which the thick-root-portion centerline Cr and the flowing water surface 12f of the band 12 intersect, and a tangent T4 on the flowing water surface 12f of the band 12, the tangent T4 passing through the intersection Y, define an acute angle (angle Apr') on the negative pressure surface 13N side of the vane 13, and define an obtuse angle on the pressure surface 13P side thereof, as shown in FIGS. 4A and 4B.

In more detail, in all the respective radial sections in the range from the first plane P1 up to the second plane P2, the tangent T3 and the tangent T4 and respective tangents corresponding to them define an acute angle on the negative pressure surface 13N side of the vane 13, and define an obtuse angle on the pressure surface 13P side thereof. However, in one of the respective radial sections in the range from the first plane P1 up to the second plane P2 in the runner rotation direction, a pair of or pairs of tangents corresponding to the tangent T3 and the tangent T4 may define an acute angle on the negative pressure surface 13N side of the vane 13, and may define an obtuse angle on the pressure surface 13P side thereof.

Also in this embodiment, when an impact load is applied to the pressure surface 13P of the vane 13 in the vicinity of the outlet end 15, for example, the vane 13 can be deformed so as to be pulled in its flowing-water-surface direction (the direction along the centerline Cv), whereby the vane 13 can bear a part of the impact load in its flowing-water-surface direction. Thus, it is possible to prevent the shear stress in the vane thickness direction from becoming excessively large, on and around the outlet end 15 of the vane 13 on the band 12 side.

Thus, it is possible to relieve stress concentration on and around the outlet end 15 of the vane 13 on the band 12 side. The shape according to this embodiment is also particularly effective, under the condition that, when an impact load is generated in the vicinity of the outlet end 15 of the vane 13, an integrated value of the load received by the pressure surface 13P of the vane 13 from the band 12 to the crown 11 on a line included in the radial section is significantly large.

Under the above condition that, when an impact load is generated, an integrated value of the load received by the pressure surface 13P of the vane 13 from the band 12 to the crown 11 on a line included in the radial section is significantly large, it is preferable that the relationship between the tangent T3 and the tangent T4, which is specified in the second embodiment, and the relationship between the tangent T1 and the tangent T2, which is specified in the first embodiment, are simultaneously established. In this case, it is possible to effectively relieve the stress concentration on and around the outlet end 15 of the vane 13 on the band 12 side.

Third Embodiment

Next, a third embodiment is described with reference to FIGS. 5A and 5B. Constituent elements of the third embodiment, which are the same as those of the first and second embodiments, are designated by the same symbols, and description thereof is sometimes omitted.

Figure 5A:
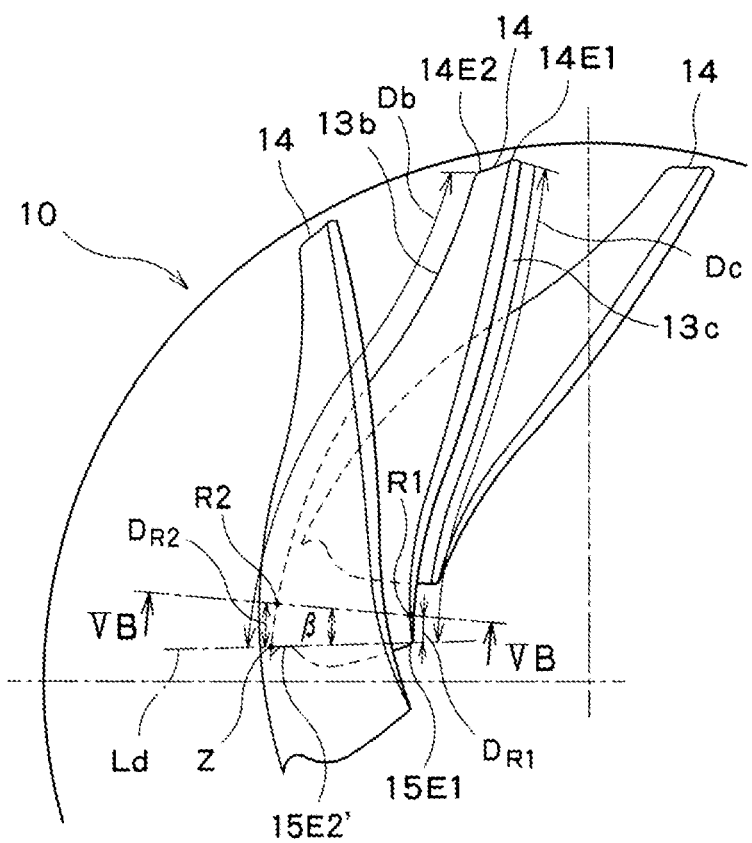
FIG. 5A is a view of a Francis turbine runner according to a third embodiment, seen in a direction corresponding to the direction of the arrow II of FIG. 1.

FIG. 5A is a view of a Francis turbine runner 10 according to a third embodiment, seen in a direction corresponding to the direction of the arrow II of FIG. 1. FIG. 5B is a sectional view of a part in the vicinity of an outlet 15 of a vane 13 of the runner 10, along a VB-VB line of FIG. 5A.

In FIG. 5A, a symbol Ld indicates a line (herebelow outlet-end standard line) passing through an end point 15E1 of the outlet end 15 of the vane 13 on the crown 11 side, and an end point 15E2' of the outlet end 15 in the runner rotation direction excluding this end point 15E1. The end point 15E2' is positioned on a front side (upstream side) in the runner rotation direction with respect to a connection point between the outlet end 15 and the band 12. However, in a case where the end point 15E1 of the outlet end 15 on the crown 11 side is excluded, when the connection point between the outlet end 15 and the band 12 is positioned on the frontmost side (most upstream side) in the runner rotation direction, the connection point corresponds to the end point 15E2'. A symbol β indicates a range from the outlet-end standard line Ld up to 5%, with respect to a vane length from the outlet-end standard line Ld up to the inlet end 14 of the vane 13 in a chord length direction. The range β is defined by the outlet-end standard line Ld and a VB-VB line in FIG. 5.

Figure 5B:
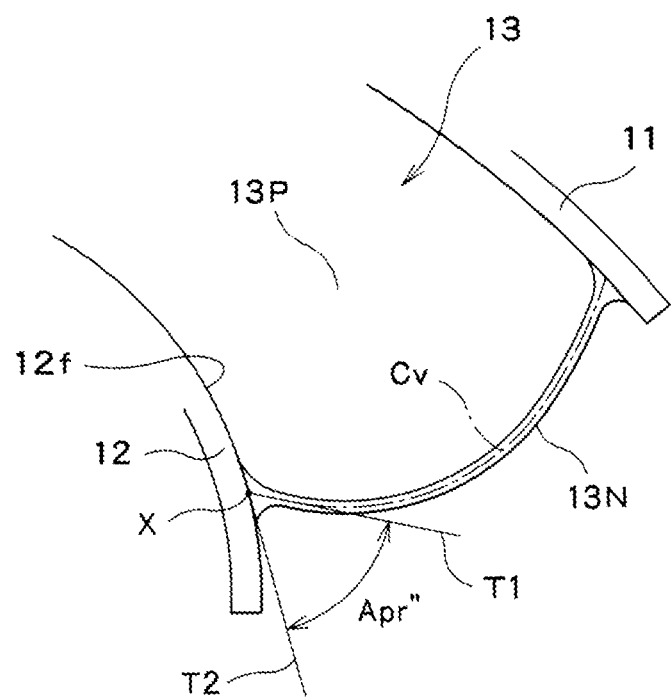
FIG. 5B is a sectional view of a part in the vicinity of an outlet end of a vane of the runner, along a VB-VB lien of FIG. 5A.

In this embodiment, in the aforementioned range β, when respective sections of the vane 13 are taken at innumerable planes (plural planes) extending in the runner axial direction and including line passing through reference points R1 and R2 at which a ratio of a distance $D_{R1}$ from the end point 15E1 of the outlet end 15 on the crown 11 side up to the reference point R1 (one reference point) that is set on a crown side edge 13c within the range β, with respect to a distance Dc of the crown side edge 13c of the vane 13, the distance Dc being from the end point 15E1 of the outlet end 15 on the crown 11 side up to an end point 14E1 of the inlet end 14 on the crown 11 side, and a ratio of a distance $D_{R2}$ from a standard point Z up to the reference point R2 (the other reference point) that is set on the band side edge 13b within the range β, with respect to a distance Db of the band side edge 13b of the vane 13, the distance Db being from the standard point Z, which is determined at a position where the outlet-end standard line Ld and the flowing water surface 12f of the band 12 (or the band side edge 13b of the vane 13) intersect, up to an end point 14E2 on the band 12 side of the inlet end 14, are the same, in at least one section of the respective sections, a tangent T1 on a centerline Cv of the vane 13, the tangent T1 passing through an intersection X at which the curvilinearly continuous centerline Cv of the vane 13 and the flowing water surface 12f of the band 12 intersect, and a tangent T2 on the flowing water surface 12f of the band 12, the tangent T2 passing through the intersection X, define an acute angle (angle Apr") on the negative pressure surface 13N side of the vane 13, and define an obtuse angle on the pressure surface 13P side thereof, as shown in FIG. 5B.

In FIG. 5A, the reference points R1 and R2 are positioned on the VB-VB line, for example. In this embodiment, at a plane extending in the runner axial direction in the section of the vane 13 and including at least the VB-VB line in the section of the vane 13, the tangent T1 and the tangent T2 define an acute angle on the negative pressure surface 13N side of the vane 13, and define an obtuse angle on the pressure surface 13P side thereof. In more detail, in all the respective sections at the respective reference points R1 and R2 in the whole range β, the tangent T1 and the tangent T2 and respective tangents corresponding to them define an acute angle on the negative pressure surface 13N side of the vane 13, and define an obtuse angle on the pressure surface 13P side thereof. However, in one of the respective sections at the respective reference points R1 and R2 in the whole range β, a pair of or pairs of tangents corresponding to the tangent T1 and the tangent T2 may define an acute angle on the negative pressure surface 13N side of the vane 13, and may define an obtuse angle on the pressure surface 13P side thereof.

Also in this embodiment, when an impact load is applied to the pressure surface 13P of the vane 13 in the vicinity of the outlet end 15, for example, the vane 13 can be deformed so as to be pulled in its flowing-water-surface direction (the direction along the centerline Cv), whereby the vane 13 can bear a part of the impact load in its flowing-water-surface direction. Thus, it is possible to prevent the shear stress in the vane thickness direction from becoming excessively large, on and around the outlet end 15 of the vane 13 on the band 12 side.

Thus, it is possible to relieve stress concentration on and around the outlet end 15 of the vane 13 on the band 12 side. The shape according to this embodiment is particularly effective, under a condition that, when an impact load is generated in the vicinity of the outlet end 15 of the vane 13, an integrated value of the load received by the pressure surface 13P of the vane 13 from the band 12 to the crown 11 on the outlet-end standard line Ld is significantly large. Namely, under this condition, strength around the joint portion between the outlet end 15 and the band 12 can be particularly effectively secured.

Fourth Embodiment

Next a fourth embodiment is described with reference to FIG. 6. Constituent elements of the fourth embodiment, which are the same as those of the first to third embodiments, are designated by the same symbols, and description thereof is sometimes omitted.

Figure 6:
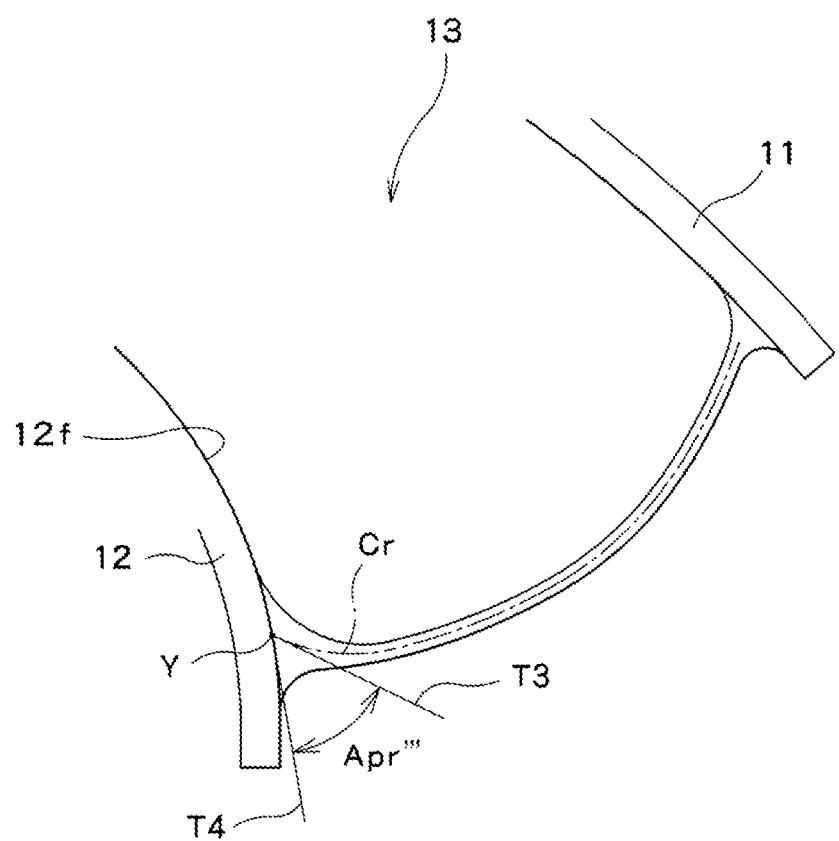
FIG. 6 is a sectional view of a part in the vicinity of an outlet end of a vane of a Francis turbine runner according to a fourth embodiment, corresponding to the sectional view along the VB-VB line of FIG. 5A.

FIG. 6 is a sectional view of a vicinity of the outlet end 15 of the vane 13 of the runner of the Francis turbine according to the fourth embodiment, which corresponds to the section along the VB-VB line of FIG. 5A.

With reference also to FIG. 5A, in this embodiment, in the range β described in the third embodiment, when respective sections of the vane 13 are taken at innumerable planes (plural planes) extending in the runner axial direction and including line passing through reference points R1 and R2 at which a ratio of a distance $D_{R1}$ from the end point 15E1 of the outlet end 15 on the crown 11 side up to the reference point R1 that is set on a crown side edge 13c within the range β, with respect to a distance Dc of the crown side edge 13c of the vane 13, the distance Dc being from the end point 15E1 of the outlet end 15 on the crown 11 side up to an end point 14E1 of the inlet end 14 on the crown 11 side, and a ratio of a distance $D_{R2}$ from a standard point Z up to the reference point R2 that is set on the band side edge 13b within the range β, with respect to a distance Db of the band side edge 13b of the vane 13, the distance Db being from the standard point Z, which is determined at a position where the outlet-end standard line Ld and the flowing water surface 12f of the band 12 (or the band side edge 13b of the vane 13) intersect, up to an end point 14E2 on the band 12 side of the inlet end 14, are the same, and when a curvilinear thick-root-portion centerline Cr, which connects a plurality center of inscribed circles inscribed in the thick root portions 16P and 16N on the pressure surface 13P side and the negative pressure surface 13N side, is drawn in each of the respective sections, in at least one section of the respective sections, a tangent T3 on the thick-root-portion centerline Cr, the tangent t3 passing through an intersection Y at which the thick-root-portion centerline Cr and the flowing water surface 12f of the band 12 intersect, and a tangent T4 on the flowing water surface 12f of the band 12, the tangent T4 passing through the intersection Y, define an acute angle (angle Apr''') on the negative pressure surface 13N side of the vane 13, and define an obtuse angle on the pressure surface 13P side thereof, as shown in FIG. 6.

In more detail, in all the sections at the respective reference points R1 and R2 in the whole range β, the tangent T3 and the tangent T4 and respective tangents corresponding to them define an acute angle on the negative pressure surface 13N side of the vane 13, and define an obtuse angle on the pressure surface 13P side thereof. However, in one of the respective sections at the respective reference points R1 and R2 in the whole range β, a pair of or pairs of tangents corresponding to the tangent T3 and the tangent T4 may define an acute angle on the negative pressure surface 13N side of the vane 13, and may define an obtuse angle on the pressure surface 13P side thereof.

Also in this embodiment, when an impact load is applied to the pressure surface 13P of the vane 13 in the vicinity of the outlet end 15, for example, the vane 13 can be deformed so as to be pulled in its flowing-water-surface direction (the direction along the centerline Cv), whereby the vane 13 can bear a part of the impact load in its flowing-water-surface direction. Thus, it is possible to prevent the shear stress in the vane thickness direction from becoming excessively large, on and around the outlet end 15 of the vane 13 on the band 12 side.

Thus, it is possible to relieve stress concentration on and around the outlet end 15 of the vane 13 on the band 12 side. The shape according to this embodiment is also particularly effective, under a condition that, when an impact load is generated in the vicinity of the outlet end 15 of the vane 13, an integrated value of the load received by the pressure surface 13P of the vane 13 from the band 12 to the crown 11 on the outlet-end standard line Ld is significantly large.

Under the above condition that, when an impact load is generated in the vicinity of the outlet end 15 of the vane 13, an integrated value of the load received by the pressure surface 13P of the vane 13 from the band 12 to the crown 11 on the outlet-end standard line Ld is significantly large, it is preferable that the relationship between the tangent T3 and the tangent T4, which is specified in the fourth embodiment, and the relationship between the tangent T1 and the tangent T2, which is specified in the third embodiment, are simultaneously established. In this case, it is possible to effectively relieve the stress concentration on and around the outlet end 15 of the vane 13 on the band 12 side.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the sprit of the inventions. The accompanying claims and their equivalents are intended to cover such forms or modifications as would fail within the scope and spirit of the invention.

In the above respective embodiments, although the Francis turbine has been described by way of example, a Francis-type pump turbine may be provided with the runner 10 described in the above respective embodiments. In addition, as shown in FIG. 2, for example, in this embodiment, the outlet end 15 of the vane 13 is convex toward the downstream side and is concave toward the upstream side on the band 12 side. However, the shape of the outlet end 15 is not particularly limited, and may have a linear shape, for example.

What is claimed is:

1. A Francis-type turbine runner comprising a crown, a band, and a plurality of vanes provided between the crown and the band, wherein
in a range from a first plane including a runner rotation center axis and an end point of an outlet end of the vane on the band side, up to a second plane corresponding to a position where the first plane is rotated by an angle, which is determined by dividing 360° by a value that is four times the number of vanes, in a runner rotation direction about the runner rotation center axis, when respective sections of the vane are taken at a plane including the runner rotation center axis and radially extending from the runner rotation center axis,
in at least one section of the respective sections, a tangent on a centerline of the vane, the tangent passing through an intersection at which the curvilinearly continuous centerline of the vane and a flowing water surface of the band intersect, and a tangent on the flowing water surface, the tangent passing through the intersection, define an acute angle on a negative pressure surface side of the vane, and define an obtuse angle on a pressure surface side thereof.

2. The Francis-type turbine runner according to claim 1, wherein
in all the respective sections, the tangent on the centerline of the vane and the tangent on the flowing water surface of the band define an acute angle on the negative pressure surface side, and define an obtuse angle on the pressure surface side.

3. A Francis-type turbine comprising the Francis-type turbine runner according to claim 1.

4. The Francis-type turbine according to claim 3, wherein a specific speed Ns is 200 or less.

5. A Francis-type turbine runner comprising a crown, a band, and a plurality of vanes provided between the crown and the band, wherein
each of the vanes has a thick root portion formed on the band side of a pressure surface to be joined to the band, and a thick root portion formed on the band side of a negative pressure surface to be joined to the band, with a thickness of each thick root portion being gradually increased toward the band,
in a range from a first plane including a runner rotation center axis and an end point of an outlet end of the vane on the band side, up to a second plane corresponding to a position where the first plane is rotated by an angle, which is determined by dividing 360° by a value that is four times the number of vanes, in a runner rotation direction about the runner rotation center axis, when respective sections of the vane are taken at a plane including the runner rotation center axis and radially extending from the runner rotation center axis, and when a curvilinear thick-root-portion centerline, which connects a plurality center of inscribed circles inscribed in the thick root portions on the pressure surface side and the negative pressure surface side, is drawn in each of the respective sections,
in at least one section of the respective sections, a tangent on the thick-root-portion centerline, the tangent passing through an intersection at which the thick-root-portion centerline and a flowing water surface of the band intersect, and a tangent on the flowing water surface of the band, the tangent passing through the intersection, define an acute angle on the negative pressure surface side of the vane, and define an obtuse angle on the pressure surface side thereof.

6. The Francis-type turbine runner according to claim 5, wherein
in all the respective sections, the tangent on the thick-root-portion centerline and the tangent on the flowing water surface of the band define an acute angle on the negative pressure surface side, and define an obtuse angle on the pressure surface side.

7. A Francis-type turbine comprising the Francis-type turbine runner according to claim 5.

8. A Francis-type turbine runner comprising a crown, a band, and a plurality of vanes provided between the crown and the band, wherein
in a range from a line passing through an end point of an outlet end of the vane on the crown side and an end point of the outlet end in a runner rotation direction excluding the end point of the outlet end on the crown side, up to 5%, with respect to a vane length from the line up to an inlet end of the vane in a chord length direction,
when respective sections of the vane are taken at a plane extending in a runner axial direction and including line passing through reference points at which a ratio of a distance from the end point of the outlet end on the crown side up to one reference point that is set on a crown side edge within the range up to 5%, with respect to a distance of the crown side edge of the vane, the distance of the crown side edge being from the end point of the outlet end on the crown side up to an end point of the inlet end on the crown side, and a ratio of a distance from a standard point up to the other reference point that is set on a band side edge within the range up to 5%, with respect to a distance of the band side edge of the vane, the distance of the band side edge being from the standard point, which is determined at a position where the line and a flowing water surface of the band intersect, up to an end point of the inlet end on the band side, are the same,
in at least one section of the respective sections, a tangent on a centerline of the vane, the tangent passing through an intersection at which the curvilinearly continuous centerline of the vane and the flowing water surface of the band intersect, and a tangent on the flowing water surface of the band, the tangent passing through the intersection, define an acute angle on the negative pressure surface side of the vane, and define an obtuse angle on the pressure surface side thereof.

9. The Francis-type turbine runner according to claim 8, wherein
in all the respective sections, the tangent on the centerline of the vane and the tangent on the flowing water surface of the band define an acute angle on the negative pressure surface side, and define an obtuse angle on the pressure surface side.

10. A Francis-type turbine comprising the Francis-type turbine runner according to claim 8.

11. A Francis-type turbine runner comprising a crown, a band, and a plurality of vanes provided between the crown and the band, wherein
each of the vanes has a thick root portion formed on the band side of a pressure surface to be joined to the band, and a thick root portion formed on the band side of a negative pressure surface to be joined to the band, with a thickness of each thick root portion being gradually increased toward the band, in a range from a line passing through an end point of an outlet end of the vane on the crown side and an end point of the outlet end in a runner rotation direction excluding the end point of the outlet end on the crown side, up to 5%, with respect to a vane length from the line up to an inlet end of the vane in a chord length direction, when respective sections of the vane are taken at a plane extending in a runner axial direction and including line passing through reference points at which a ratio of a distance from the end point of the outlet end on the crown side up to one reference point that is set on a crown side edge within the range up to 5%, with respect to a distance of the crown side edge of the vane, the distance of the crown side edge being from the end point of the outlet end on the crown side up to an end point of the inlet end on the crown side, and a ratio of a distance from a standard point up to the other reference point that is set on a band side edge within the range up to 5%, with respect to a distance of the band side edge of the vane, the distance of the band side edge being from the standard point, which is determined at a position where the line and a flowing water surface of the band intersect, up to an end point of the inlet end on the band side, are the same, and when a curvilinear thick-root-portion centerline, which connects a plurality center of inscribed circles inscribed in the thick root portions on the pressure surface side and the negative pressure surface side, is drawn in each of the respective sections, in at least one section of the respective sections, a tangent on the thick-root-portion centerline, the tangent passing through an intersection at which the thick-root-portion centerline and the flowing water surface of the band intersect, and a tangent on the flowing water surface of the band, the tangent passing through intersection, define an acute angle on the negative pressure surface side of the vane, and define an obtuse angle on the pressure surface side thereof.

12. The Francis-type turbine runner according to claim 11, wherein in all the respective sections, the tangent on the thick-root-portion centerline and the tangent on the flowing water surface of the band define an acute angle on the negative pressure surface side, and define an obtuse angle on the pressure surface side.

13. A Francis-type turbine comprising the Francis-type turbine runner according to claim 11.

* * * * *